June 6, 1933. M. FELLER 1,912,439
BEVERAGE MANUFACTURE
Filed March 29, 1932
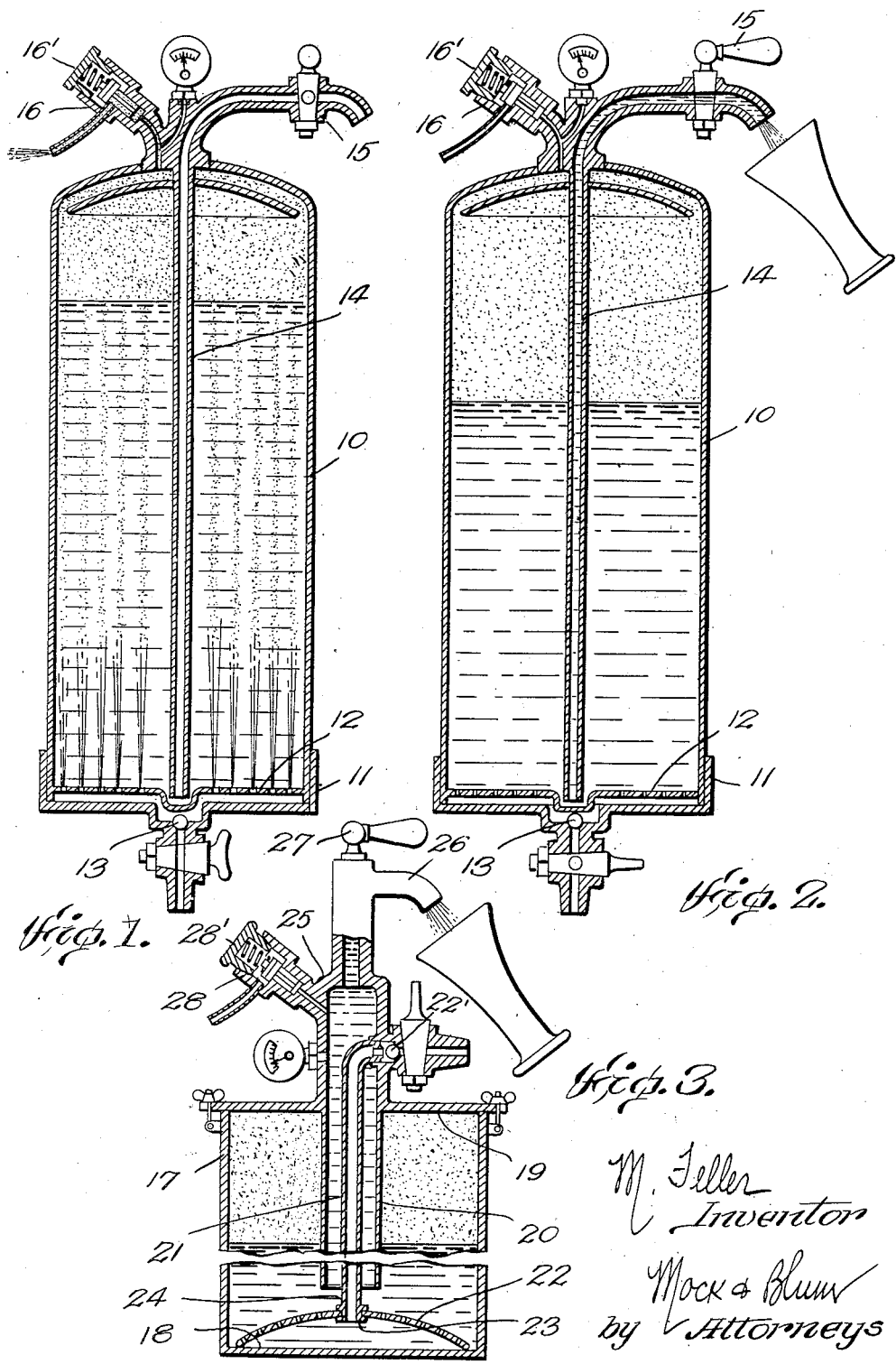

Patented June 6, 1933

1,912,439

UNITED STATES PATENT OFFICE

MAXIMILIAN FELLER, OF BROOKLYN, NEW YORK

BEVERAGE MANUFACTURE

Application filed March 29, 1932. Serial No. 601,768.

This invention relates to an improved milk beverage or the like, and an improved process of producing such a beverage.

Milk, as a food, as well as a drink, in its natural or any prepared form, no doubt constitutes the most efficient combination of health elements, for the development of the human body. Nevertheless a great many adults and children have a distinct aversion to drinking milk because of its taste.

There is still another reason why sick people and convalescents develop a dislike to drinking milk, which aversion is chiefly caused by their inability to assimilate milk readily. The undigestibility of milk can be traced directly to the milk's tendency of producing bacteriological changes within the digestive tract, to which the nerve centre reacts adversely and causes a repulsive feeling, even at the mere sight of milk.

Many attempts were made to find a solution for overcoming the aforesaid disadvantages of, and human dislike to milk. In this direction unsuccessful efforts were made to provide a milk beverage capable of not only overcoming the aforementioned obstacles, but to render it acceptable for general public consumption. Such efforts were particularly focused upon different treatments of milk, especially with carbon dioxid. Moreover, these treatments had primarily for their object the preservation of milk, while secondary consideration was given to the palatability of the beverage. This is one of the reasons why the introduction of such milk beverages was unsuccessful.

It is a fundamental, scientific fact that milk, like many other liquids, will to some extent dissolve carbon dioxid under certain specific conditions, as for instance under a certain pressure and at a certain temperature, when a definite volume of the gas becomes absorbed by the milk.

The problem of producing a carbonated milk beverage, of such essential properties as to make the beverage not only wholesome, but also easily digestible and palatable, may be only solved by definitely controlling the degree of solubility of carbon dioxid in the milk.

While the pressure of the gas may be easily governed, as may be also the temperature, no practical method has been found as yet for accomplishing the aforesaid results by accurately governing the absorption of carbon dioxid by the milk.

Efforts in this direction will prove a failure when it is attempted to incorporate carbon dioxid merely by pressure into either pre-heated, cooked, cold or otherwise treated milk; no matter for which length of time the pressure is applied, or how high a pressure is maintained, the physical and chemical properties of the milk will remain almost unchanged.

Similarly, relatively unsatisfactory results of carbonation will be obtained when it is attempted to better co-mix carbon dioxid with the milk in closed vessels by external agitation, such as rocking, shaking or otherwise imparting a movement to the vessel, or by alternately charging the milk with carbon dioxid and releasing the gas by hand at stated intervals. The product of such or similar operations will be a partially carbonated beverage of rather poor quality, compared with the results obtained through the employment of my process described herein.

Another important disadvantage of the aforementioned steps used for producing a carbonated beverage resides in the fact that it is practically impossible to obtain a beverage of a uniform consistency and of a definite volume, which two properties are of foremost importance in the commercialization of the product.

Devices were built for incorporating carbon dioxid into milk by stirring or agitating the latter internally, that is, within the vessel, which attempts often resulted in either producing whipped cream, butter or a similar product, or in turning the milk sour. Also by such arrangements a well carbonated beverage of a uniform volume and consistency could not be obtained.

It is one of the main objects, of this invention to produce a thoroughly carbonated milk beverage of uniform consistency and definitely ascertainable volume, and in which a defined quantity of carbon dioxid is dissolved, all of which factors govern the taste, palatability, digestability, preservability and the marketable value of the beverage.

Another object of this invention is to provide a milk beverage of champagne character, permeated with carbon dioxid and having milk as its major constituent, the volume of which beverage, when ready to be dispensed, is not only considerably increased over the original volume of the milk, and whatever ingredients are mixed thereinto, but which volume and consistency is definitely ascertainable, prior to the production of the beverage, whereby a certain standardization of the volume and of the consistency of the beverage may be determined and maintained.

Another object of this invention is to provide an effervescent milk beverage, which is not only highly palatable and tasty, but which has the tendency of overcoming any reluctance to drinking of plain milk.

Another object of this invention is to provide a milk beverage in which the original, nutritious properties of the milk remain unchanged, whereas its physical properties are favorably affected through the absorption of a certain definite volume of gas, so that an effervescent, frothy beverage is obtained, which is readily assimilable by the digestive tract.

Another object of this invention is to provide an effervescent homogeneous beverage of the aforesaid characteristics, the taste of which may be materially improved by the addition of suitable flavoring matter, so as to produce a palatable, light, thirst-quenching "soft drink", having the quality of creating a desire for drinking it, thus inviting wide-spread consumption.

A further object of this invention is to provide a milk beverage of the aforesaid character, in which bacterial propagation and contamination is deferred for a much longer period of time than it is possible to achieve by heretofore known preservation methods, as for instance, boiling, pasteurizing or refrigeration.

A further object of this invention is to provide a milk beverage of champagne character, which may be either prepared in central plants and shipped over long distances, without any detrimental defect to the beverage at ordinary atmospheric temperatures, in the same containers in which it is produced and from which it is intended to be dispensed; or which may be manufactured right at the place where it is to be sold, in the same containers from which it is to be dispensed, thereby eliminating the cost of distribution.

Another object of my invention is to provide an effervescent beverage of the aforesaid physical and other properties containing a highly vitamin-rich ingredient, as for instance, an oil-free cotton seed meal, which contains vitamins A, B, C, D and E in a percentage greater than any other vegetable or animal matter or substance known.

A still further object of this invention is an improved process, whereby a milk beverage of the aforesaid benefits and properties may be effectively produced.

The foregoing and still further objects will become more thoroughly understood from the following specification, in connection with the accompanying diagrammatical drawing, all intended to graphically explain an improved method for effectively producing a milk beverage of champagne character, and of standardized consistency and volume, without the intention of limiting either the process, nor the illustrations to the actual description and showing, and in which drawing Fig. 1 is a diagrammatical cross-sectional view through one form of a carbonating vessel, during the process of charging the milk.

Fig. 2 is the same type of vessel showing the carbonated milk while dispensing it therefrom.

Fig. 3 illustrates a diagrammatical cross-sectional view through a modified form of the vessel.

Process

This present process is a complete departure from heretofore known, or used methods, and in order to facilitate its understanding, reference to the accompanying drawing will serve to advantage.

In Figures 1 and 2, numeral 10 denotes a closed container with a removable bottom 11. Adjacent to the bottom there will be seen a strainer 12 forming with the bottom a gas receiving chamber. The bottom is provided with an intake check-valve 13, which automatically opens when $CO_2$ is introduced and which automatically closes, absolutely tight, when the $CO_2$ supply is cut off. From the top of the container extends a dispensing pipe 14 to the bottom thereof and is controlled by a valve 15. At the top of the container there is provided an automatic gas release valve 16, which represents one of the most important features of the device. This release valve also serves as a safety vent, during the process of carbonation, and may be fully closed by a screw cap 16'.

In Figure 3, a container 17 is indicated, provided with a fixed bottom 18. At the top of the container there is a removable cover 19, from which extends downwardly an outer dispensing tubing 20, and an inner charging tubing 21. A strainer 22, which is attached to the inner tubing by means of a bushing 23, forms a gas receiving chamber with fixed bottom 18. The inner, charging tubing 21 is provided on top of the container with an automatic intake checkvalve 22' operating in the same manner as checkvalve 13 in Figures 1 and 2. The outer tubing 20 extends at 24 right above the strainer 22 and is connected to the cover extension 25, terminating in a dispensing outlet 26, controlled by valve 27. With the cover extension 25 there is also connected an automatic gas release valve 28, which may be closed by a screw cap 28'.

The devices described in Figures 1 and 2 and the modification shown in Figure 3, contain arrangements serving for the same purposes in both designs.

Operation

A container (10 or 17), say of five (5) gallon size, is filled to about ⅔ or ¾ with milk to which are added ingredients of any desired properties, as for example, flavored syrup, coloring matter, oil-free cotton seed meal, or other matter which is combined with the milk either singly or in any preferred combination. The container is sealed and carbon dioxid gas is introduced through the automatic intake valve (13 or 22') into the gas receiving chamber, at a steady pressure of 75 pounds to the square inch, for a given time, say five (5) minutes.

When the gas receiving chamber is filled with carbon dioxid, the gas is forcibly ejected through a great number of perforations provided in the strainer (12 or 22), in the form of steady, minute sprays or jets into the prepared milk, and passes through it to the top thereof into the upper part of the vessel, which contains atmospheric air. While the gas rises, not only because it is lighter than the milk, but primarily due to the pressure under which it is forced thereinto, the entire body of the milk mixture is thoroughly sprayed from the bottom-most layer to the top.

Obviously, the passage of the gas through the prepared milk will stop as soon as the pressure within the container becomes equal to the pressure at which the gas is supplied. Now the screw cap (16' or 28') is loosened and the automatic release valve (16 or 28) is allowed to function, in that it is adjusted to a pressure lower than that at which the gas is introduced, say to about 60 pounds. Thus the carbon dioxid, entering at a pressure of 75 pounds, will flow in steady, continuous pressure streams at high velocity through the prepared milk at an effective working pressure of 60 pounds. While passing through the milk, the gas comes into frictional engagement with all milk particles, particularly its colloidal solid substances, to which air adheres with great tenacity, and dislodges and takes the place of that air, which latter is considered the chief cause of germ propagation. During this process a steadily increasing amount of gas is rapidly dissolved.

The degree of dissolution of carbon dioxid in the milk depends entirely upon the length of time the gas is allowed to pass through the liquid. The degree of such gas absorption moreover governs the consistency and the volume of the finished beverage. It becomes evident, therefore, that any desired consistency and volume may be imparted to the beverage, depending upon the time allowed for the gas to pass through the prepared milk. It will be noted that the gas is allowed to escape only at a pressure which is above the atmospheric pressure, so that the gas within the vessel is retained at the carbonation pressure. Of course, the time of treatment may vary with variations in this carbonation pressure. A few tests will determine various degrees of carbonation up to a complete saturation of the milk by carbon dioxid, whereby it is made possible to definitely standardize the volume and the consistency of the future beverage.

Thus it becomes possible also to exactly state in advance, what the volume of the finished beverage will be, (when the volume of the pre-mixed milk composition is known,) provided, of course, that a "standard" is fixed as to the time employed for charging.

When the charging procedure, which may be called "automatic carbonation", is finished, the screw cap (16' or 28') is tightened down and the gas supply is cut off. The beverage is now ready to be dispensed.

Through the above described "automatic carbonation" not only a steady and quick dissolution of carbon dioxid in the liquid is accomplished, but a complete removal of the air contained in the milk and the atmospheric air at the upper part of the container is assured. The carbon dioxid replacing the top air is brought to and maintained at a head pressure of 75 pounds. This pressure serves for the purpose of keeping the dissolved carbon dioxid within the milk, and not only helps to preserve the latter, but is instrumental in dispensing the beverage from the container to the last drop.

I have found from experience that a beverage, the volume of which was increased two and one half (2½) times over the original volume of the prepared milk, constitutes just the ideal milk beverage of a real champagne character. In addition to having an excellent taste, being light, effervescent and of frothy consistency, the beverage is easily digestible and will effectively inhibit the development of bacteria. As thus prepared, the improved milk beverage is of uniform consistency. The size of the bubbles is controlled by the difference between the inlet pressure and the outlet pressure. Likewise, since the milk beverage is carbonated without any stirring action other than the stirring action which is produced by the passage of the bubbles through the liquid, there is no substantial coagulation of the casein, even though the acidity of the milk is increased by the incorporation of the carbon dioxide. Likewise, when the improved product is dispensed, it flows easily because it always retains its liquid form. When the improved product is dispensed, bubbles of carbon dioxide escape therefrom and the volume of the beverage is substantially diminished in a short time, the product always retaining its liquid character, and without the formation of a stiff foam which would prevent the liquid from flowing out of the glass.

A finished beverage, the increased volume of which is less than two and one half (2½) times the volume of the original liquid, will possess a light body, whereas a beverage of an increased volume, greater than two and one half (2½) times the original volume of the liquid, will have a fuller body, will taste richer, and will resemble a creamy substance.

Obviously, any size container may be employed in producing a satisfactory milk beverage; thus small cans, say of one gallon capacity may be used for home consumption, five to ten gallon cans for fountain stands, and twenty gallon cans for farm and road stands. The process remains the same for all sizes of cans, except that the intake and discharge pressures are varied in accordance with the size. Lower pressure will be employed for a smaller sized container, while proportionately high pressures will be used with larger cans.

The aforedescribed process possesses numerous advantages over existing methods of carbonating milk. Aside of the fact that the solubility of carbon dioxid in the milk may be precisely governed, the process in itself represents a highly sanitary milk treatment, in that the beverage is prepared in the same container from which it is dispensed, and remains sealed until the last particle is discharged. Furthermore, the process reduces the manufacturing cost to a minimum, thereby opening a wide field for the introduction of a wholesome beverage, at a handsome profit to the dispenser. Moreover, the process lends itself to an advantageous salvage of skim milk, which at the present time is ordinarily going to waste in enormous quantities. With the addition of ingredients enumerated previously, skim milk may be readily employed in producing a wholesome beverage, which lacks only a little in its beneficial qualities over a beverage produced from full milk.

Based on my previous experience, and in view of the above described advantages, which may be only achieved through my process, I consider the present invention the only possible, practical solution of an obstinate problem, that is of producing a really faultless carbonated milk beverage.

Throughout the foregoing specification I have used the term "milk". In order to prevent any doubts as to its meaning, I wish it to be understood that under "milk" I understand, either animal milk from any source, or vegetable milk, both in natural or prepared state, full or skimmed, in liquid or solid form, or made liquid through the dissolution of a solid milk forms in liquids; prepared forms, as for instance, evaporated, condensed, powdered, dry-raw, dry-cooked, homogenized, pasteurized, sterilized, or fermented milk, with or without a bacteriological addition, as for instance bacteria known as *Bacillus bulgaricus*. Therefore, whenever the term "milk" appears in the claims, be it understood that any one of the aforementioned forms applies.

In the description the employment of carbon dioxid gas is specified, however any other suitable inert or soluble gas may find practical application in my process.

While I have described specific steps to be taken in connection with my new method, and have prescribed certain addages incorporable in the milk, be it understood that variations and improvements may be introduced, both in the process and in the combination of ingredients supplied to the beverage, in order to facilitate commercialization on a large scale and improve the qualities of the product, and I therefore reserve for myself the right to make changes and improvements in the process and the product as may become necessary, without departing from the broad scope of my invention, as set forth in the annexed claims.

I claim:

1. In the art of carbonating milk, those steps which consist in forcing the carbonating gas through a body of milk which is located in a chamber by forcing said gas into said chamber under an inlet pressure which exceeds the atmospheric pressure, and allowing the gas to escape from said chamber at an outlet pressure which is less than the inlet pressure so that the gas is forced through the milk beverage by the difference in said pressure, said outlet pressure being sufficiently above the atmospheric so as to cause sufficient carbonating gas to be retained in the milk, said passage of the gas through the milk being carried on for a sufficiently long period to carbonate the milk.

2. A method of carbonating whole milk which consists in forcing the carbonating gas through a body of the whole milk which is located in a chamber by forcing said gas into said chamber under an inlet pressure which exceeds the atmospheric pressure, and allowing the gas to escape from said chamber at an outlet pressure which is less than the inlet pressure so that the gas is forced through the liquid by the difference in said pressures, said outlet pressure being sufficiently above the atmospheric pressure and the time of treatment being sufficiently long so as to cause sufficient carbonating gas to be retained in the beverage, the milk being so carbonated without any substantial stirring action other than the stirring action which is caused by the passage of the gas through the milk, so that there is no substantial coagulation of the solid ingredients of the milk, and there is no substantial separation of the fat in the milk.

Signed at New York in the county of New York and State of New York this 11th day of March A. D. 1932.

MAXIMILIAN FELLER.